C. A. MEILICKE.
CALCULATING MACHINE.
APPLICATION FILED JULY 27, 1908.

961,631.

Patented June 14, 1910.
7 SHEETS—SHEET 1.

C. A. MEILICKE.
CALCULATING MACHINE.
APPLICATION FILED JULY 27, 1908.

961,631.

Patented June 14, 1910.
7 SHEETS—SHEET 2.

FIG. 2

WITNESSES

INVENTOR

C. A. MEILICKE.
CALCULATING MACHINE.
APPLICATION FILED JULY 27, 1908.

961,631.

Patented June 14, 1910.
7 SHEETS—SHEET 4.

C. A. MEILICKE.
CALCULATING MACHINE.
APPLICATION FILED JULY 27, 1908.

961,631.

Patented June 14, 1910.
7 SHEETS—SHEET 7.

WITNESSES

INVENTOR
C. A. Meilicke

UNITED STATES PATENT OFFICE.

CARL ARNO MEILICKE, OF HANLEY, SASKATCHEWAN, CANADA.

CALCULATING-MACHINE.

961,631.  Specification of Letters Patent.  Patented June 14, 1910.

Application filed July 27, 1908. Serial No. 445,512.

*To all whom it may concern:*

Be it known that I, CARL ARNO MEILICKE, of the town of Hanley, in the Province of Saskatchewan, Canada, lumber merchant, have invented certain new and useful Improvements in Calculating-Machines, of which the following is the specification.

My invention relates to improvements in calculating machines and the object of the invention is to produce a simple mechanism which is especially applicable in computing the number of days from one date to another, either past or future, and in finding the interest on a note for the given number of days.

The invention consists in the construction and combination of parts to be described more fully hereinafter, and definitely set forth in the claims.

Fig. 8 is an end view of the drum showing its attachments for adjusting purposes.

In the drawings like characters of reference indicate corresponding parts in each figure.

1 represents an inclosing casing which is substantially cylindrical in form and disposed with its axis horizontal, and 2 is an upwardly extending portion opening into the casing and having the upper portion 3 thereof circular in vertical cross section and the other portion 4 substantially rectangular in longitudinal cross section. The portion 4 opens into the cylindrical casing and forms the support for the circular part 3. The casing is formed into a suitable base at 5 adapted to rest upon a horizontal support such as a table or desk. At a suitable point preferably upon the upper side the wall of the cylindrical casing is provided with an elongated slot 6 which passes across the casing.

7 is a plate which has an elongated slot 8 which is used as a sight opening. The plate is suitably bolted to the casing covering over the slot or opening 6, and above the slot is a computed interest table 9 and below a second table 10, such tables being identical with those 24 and 25 which appear and are completely described in a prior application for a calculating machine, filed by me on the 4th day of March, 1908, under Serial #419215. It is considered that further description of this portion of the present machine is unnecessary.

The portion 3 is provided with a circular opening 11 in the forward face for a purpose later described.

12 and 13 are thumb heads each formed integral with a sleeve 14 which is received in bearings 15 carried by the casing. The sleeves are each formed with a shoulder 16 which rests against the respective bearings. 17 is a longitudinal shaft or axle having its ends threaded at 18 and screwing into the threaded centers of the sleeves. 19 is a drum of cylindrical form rigidly fastened to the shaft by means of radial ribs or spokes 20 passing to the hub 21 which is in turn connected to the shaft so that turning the thumb heads enables the drum to be rotated as desired. The drum is slit longitudinally at 22 and a wedge-shaped strip 23 is passed into the opening, such strip being interconnected with a radial rod 24 having a thumb screw 25 at the end thereof which screw bears on a cross brace 26 passing between the spokes. All these latter members as denoted by the numbers 12 to 16, respectively, are of the same form and interconnected in the same manner as the corresponding parts in the prior application for patent above mentioned.

The drum is provided with a chart 27 which encircles the cylindrical body thereof and has its outer face divided into longitudinal rows and circumferential columns, the number of the longitudinal rows being three hundred and sixty-four. Each longitudinal row is numbered, the number appearing through the slot 8 directly in a line with the word "Days" on the second table 10. The number of circumferential columns corresponds directly to the number of transverse columns appearing on the interest table 9, and in the successive spaces longitudinally across the chart are tabulated interests on definite amounts at a definite rate of interest for a definite number of days. A more detailed description of the chart has been given in the prior application hereinbefore mentioned. The chart on the drum coöperates with the interest tables 9 and 10 in the same manner as it does in my other machine.

28 is an annular plate securely fastened by means of bolts 29 to the front face of the portion 3, the plate partially closing over the opening 11. The inner edge of the plate is cut away to allow of the insertion of a glass plate 30, the glass being held in position by an inner metallic rim 31 bolted at 32 to the annular plate.

33 is a knob having an extending interiorly threaded sleeve 34 which receives a threaded transverse shaft 35. The extending end of the shaft is rotatably received within a sleeve 36 having a rearward enlargement 37 which is supported within a suitable bearing formed in the rear wall of the portion 3. The enlargement 37 of the sleeve is interiorly threaded and receives a screw 38 which passes inwardly from the rear face of the portion 3.

39 is a flange or extending shoulder passing outwardly from the enlarged portion 37 of the sleeve and it is adapted to abut the inner wall of the portion 3.

It will be noticed that the sleeve 36 is held in position by the combined action of the flange 39 and the screw 38, as tightening the screw jams the flange against the inner wall of the portion 3 and prevents any movement of the sleeve.

40 is a conical shaped wheel having the hub 41 rotatably mounted on the sleeve 36 and abutting the shoulder formed by the enlarged portion 37. The wheel is retained in position by a nut 42 which screws onto the threaded end of the sleeve 35 thereby limiting the play of the wheel.

Figure 1:
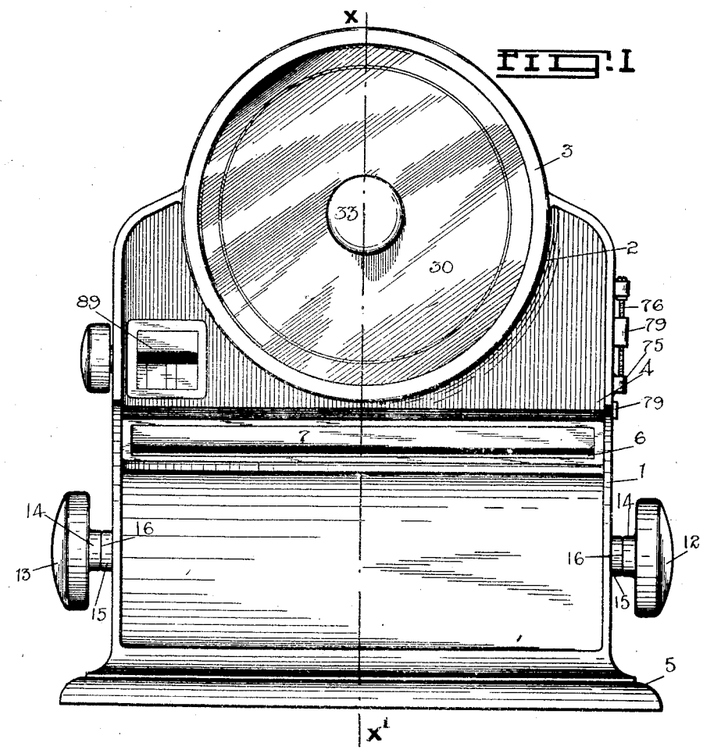
Figure 1 is a front elevation of my machine.
Figures 1, 2, 3, 4, 5, 6, 7:
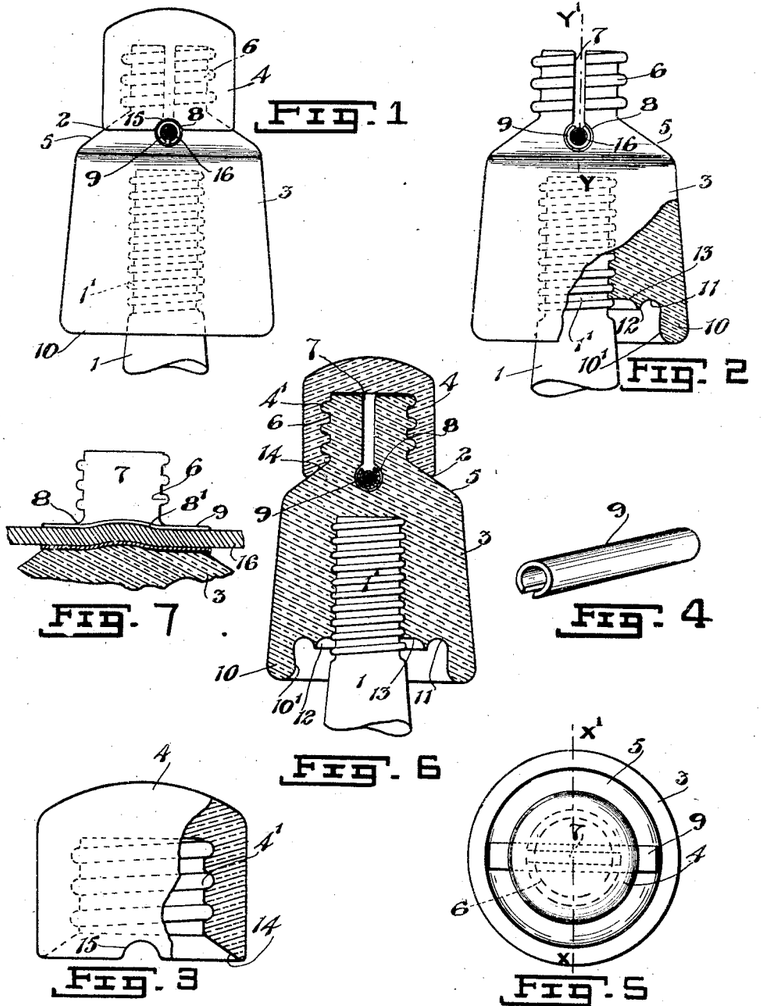
Fig. 2 is a vertical section view through the machine in the line X X', Fig. 1.
Fig. 3 is an enlarged detailed front view of the dials.
Fig. 4 is an enlarged detailed vertical sectional view of the upper portion of the machine as shown in Fig. 2.
Fig. 5 is an enlarged fragmentary view of the dials, showing the arrangement of the months and days.
Fig. 6 is an enlarged view of the right hand portion of the machine as shown in Fig. 1, part of the casing being broken away so as to show the interconnection between the drum and the dials.
Fig. 7 is an enlarged detailed side elevation of an adjuster employed in connection with the belt.
Figure 2:
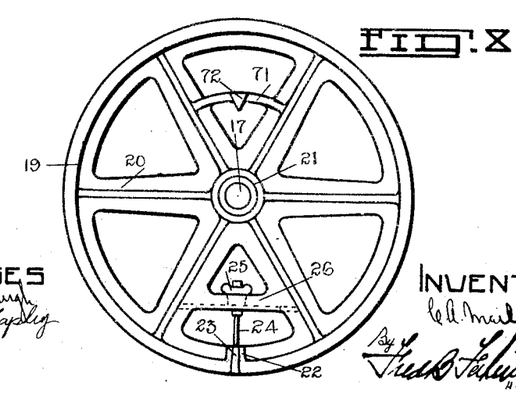
Figure 3:
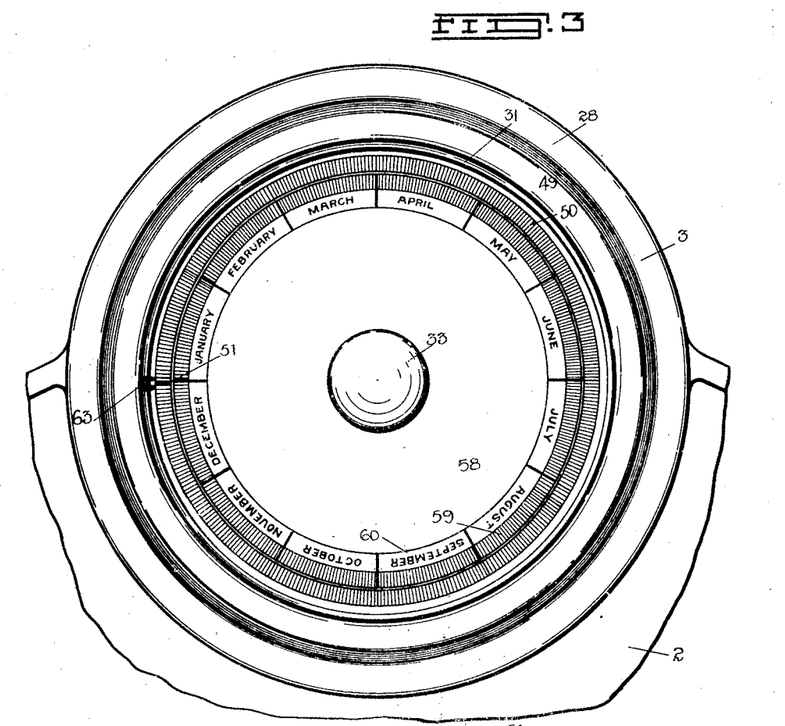
Figure 4:
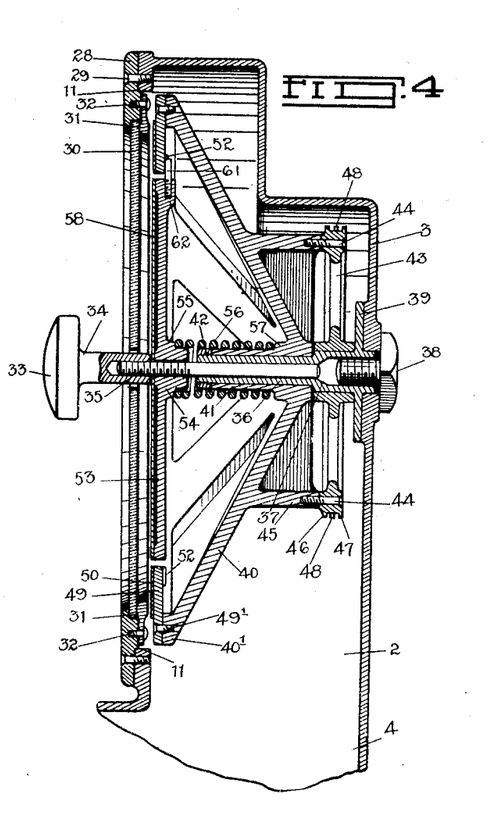
Figure 5:
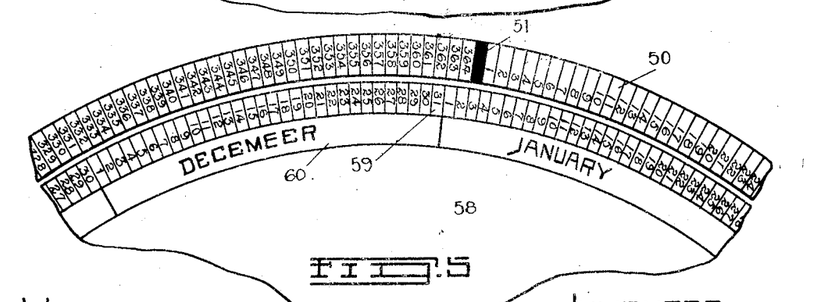
Figures 6, 7:
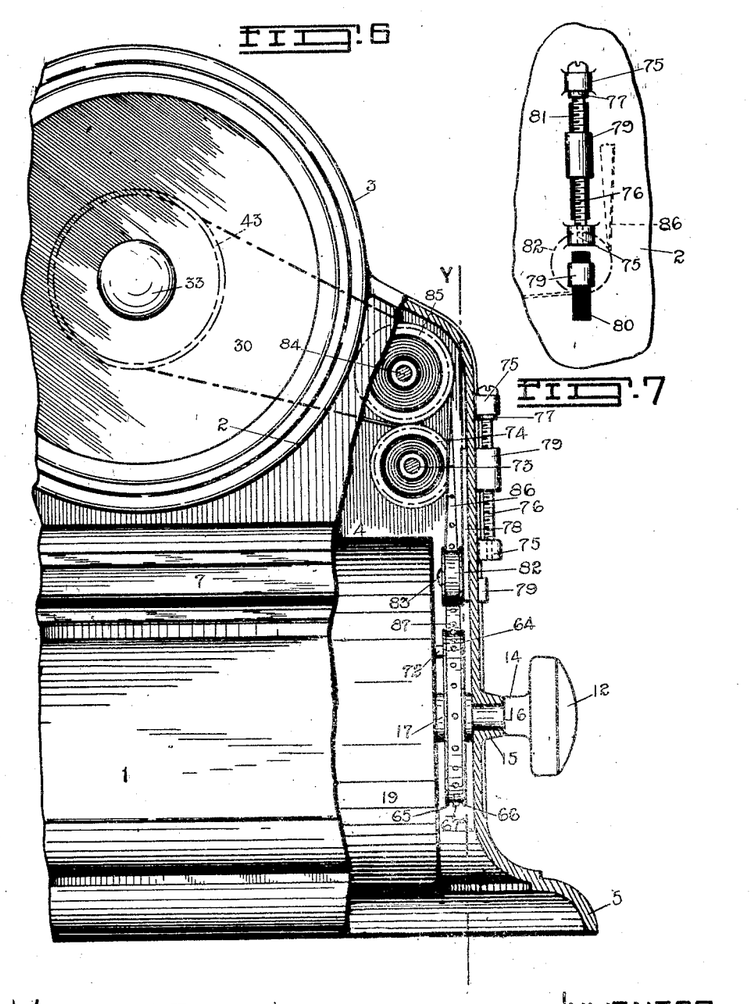

43 is a wheel centered on the enlarged portion 37 of the sleeve on which it is rotatably mounted. The wheel is firmly secured by bolts 44 to a rearwardly extending casting 45 projecting from the wheel 40. The wheel 43 is provided with side flanges 46 and 47 and has disposed around its periphery, between the flanges, teeth or pins 48, such teeth being spaced an equal distance apart. The wheel 40 has bolted to its rim 40' an annular plate or outer dial 49 which plate is adapted to appear immediately behind the rim 31. The plate is fastened to the rim by screws 49'. Upon the plate is disposed an annular card 50 which is divided into three hundred and sixty-five divisions, the divisions running across the card or radially toward the knob. One of these divisions 51 is left blank and blackened and the remainder each bear a number notating a day of the year. In referring to Figs. 3 and 5 it will be seen that these numbers start at the numeral 1, at the upper side of the black divisions 51 and progress in a clockwise rotation to the number 364 which appears immediately beneath the black space. With this arrangement there is a space or division corresponding to each longitudinal row on the drum.

52 are teeth appearing on the inner face of the dial 49 and toward the inner edge. The teeth pass completely around the dial and are for a purpose later to be explained.

53 is an inner circular dial having its hub 54 screwed on the shaft 35, it being noted that the hub is normally away from the end of the sleeve 36.

55 is a shoulder on the hub and 56 is a spiral spring encircling the hub 41 and the hub 54, and having its ends the one engaging with the shoulder 55 and the other with the shoulder 57 provided on the hub 41.

The face of the dial is supplied with a circular card 58 having at its outer edge two concentric rows 59 and 60, the inner one 60 of which is subdivided into twelve parts in which appear the names of the months of the year, consecutively, and in clockwise rotation. The outer row 59 is subdivided by radial lines in such a manner that there appears opposite each month as notated on the dial a number of these sub-divisions corresponding to the number of days in the respective months. Consequently there are three hundred and sixty-five of such subdivisions and they are adapted to register with the divisions already described on the other dial. The inner dial is screwed onto the shaft 35 so that the card 58 may normally be in the same vertical plane as the card 50.

61 is a stop pin secured firmly within an enlargement 62 formed on the inner dial. The pin is triangular in cross section and extends radially from the dial, passing upwardly beneath the inner face of the outer dial and being adapted to engage with the teeth 52. On the glass 30 I have placed a mark forming an indicator 63 which always remains stationary regardless of the position of the dials.

With the parts constructed as above described it will be seen that it is possible to move the dials either separately or together. If the knob be turned without pressing inwardly the dials will move together as the spring 56 tends to keep the stop 61 continuously in engagement with the teeth 52. To move the inner dial separately it is only necessary to force the knob inwardly which motion slides the shaft 35 within the sleeve 36 and collapses the spring. It has been stated previously that the hub 54 is normally somewhat away from the sleeve 36. The inward movement of the dial as caused by the longitudinal displacement of the shaft disengages the stop and consequently allows the inner dial to be rotated without the outer dial. As soon as the knob is released the spring forces the stop into engagement with the teeth and the two dials will rotate together.

64 is a drive wheel rotatably mounted on the sleeve 14 and it is provided with circumferential flanges 65 and 66 at its sides. Between the flanges and extending from the periphery of the wheel are pins or teeth 67 spaced equal distances apart.

Figure 9:
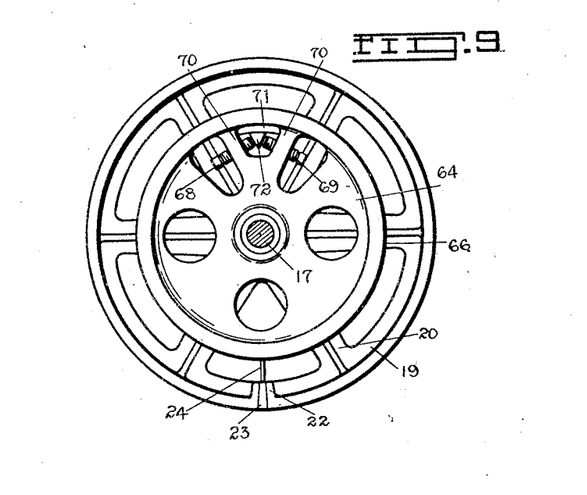
Fig. 9 is an end view of the drum and the belt receiving wheel at the end of the drum showing the manner in which the one may be adjusted in respect to the other.
Figure 10:
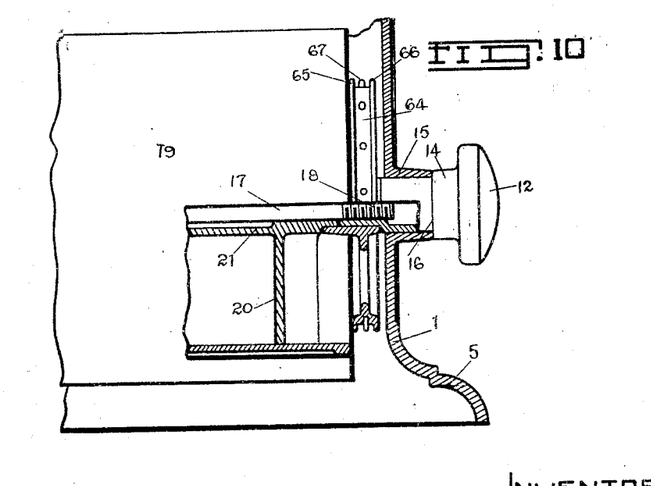
Fig. 10 is a side elevation of the drum, the knob connected with the drum, and the belt receiving wheel; parts of the drum, belt receiving wheel, and knob being shown in vertical section.
Figure 11:
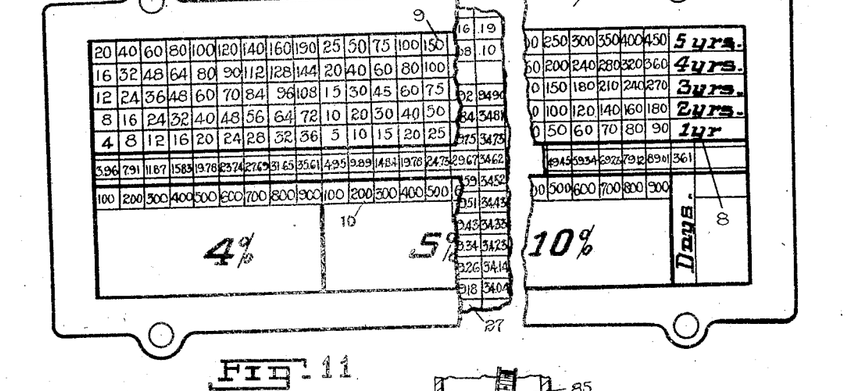
Fig. 11 represents a portion of the tabulated plate carried by the inclosed casing of the drum, and also a portion of the interest chart on the drum.
Figure 12:
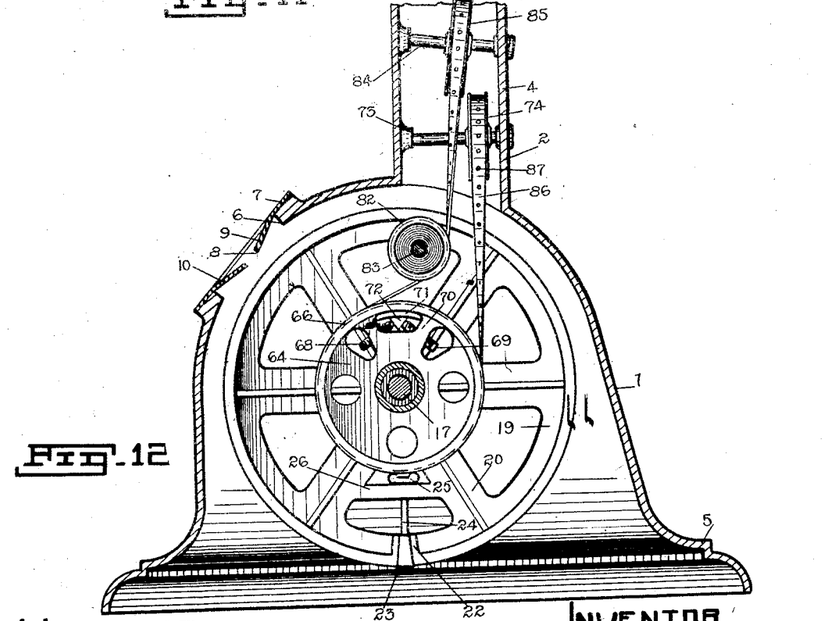
Fig. 12 is a vertical sectional view taken through the machine in the plane denoted by the line Y Y', Fig. 6.

68 and 69 are adjustable screws suitably mounted in bearings formed in ribs 70 carried by the wheel 64. The screws are so positioned on the inner face of the wheel that they converge as is shown in Fig. 9 of the drawings.

71 is a rib passing between the spokes 20, and 72 is an arm of triangular cross section extending from the rib toward the wheel 64 where it is received between the adjusting screws 68 and 69. Consequently, although the wheel 64 is rotatably mounted it cannot turn on account of the screws engaging with the arm. By tightening one of the adjusting screws and loosening the other the relative position of the wheel 64 to the drum shaft can be changed, which adjustment is of considerable importance as will shortly appear.

73 is a horizontal shaft passing across the portion 4, and 74 is a flanged wheel rotatably mounted on the shaft and positioned so that it is in the same vertical plane as the wheel 43. The shaft is so positioned that a belt with a half twist in it passing tangent to the wheel downwardly from the horizontal axis will have its lower end pass tangent to the wheel 64 at its horizontal axis.

75 are lugs extending outwardly from the side faces of the machine, such lugs being provided with axial openings into which pass a threaded screw 76. The lower end of the screw is designed to turn freely in the lower lug. The upper end of the screw turns freely in the upper lug and is provided with a shoulder 77 which abuts the lower face of the lug thereby preventing the screw from escaping upwardly.

78 is a plate supported against the inner face of the casing by means of laterally projecting pieces 79 which pass through slots 80 and 81 provided in the casing. The upper piece 79 is bored and provided with an internal thread which receives the screw 76. The lower of the pieces 79 serves to aline the plate.

82 is a flanged roller rotatably mounted on a stub shaft or pin 83 which extends from the inner face of the plate 78. This roller together with the adjusting screw serves the purpose of a belt tightener.

84 is a shaft somewhat inclined to the horizontal passing across the portion 4 of the casing above the shaft 73.

85 is a flanged wheel rotatably mounted on the shaft, such wheel being positioned somewhat forward of the wheel 74. The shaft 84 is so positioned that a twisted belt passing tangent from the horizontal axis will be directed to the roller 82.

86 is an endless metallic belt having a series of equally spaced openings 87 therein, the distance which the openings are spaced being the distance which the pins 67 and 48, respectively, are apart. The belt passes from the upper side of the wheel 43 directly to the upper side of the wheel 85 where it is given a half turn and directed downwardly under the roller 82. From the roller 82 it passes over the wheel 64 where it is given a half turn and is directed over the wheel 74 whence it returns to the wheel 43. If the belt be at any time slack such can be taken up by adjusting the screw 76 so as to throw the roller 82 downwardly.

89 represents a separate calculating machine which is for the purpose of reducing fractions of pounds English money, to shillings and pence, but as it forms no part of the present invention I will not further describe it.

When the belt is being placed on the wheels it is necessary that they be interconnected so that when the blank longitudinal row on the drum appears through the sight opening 8 the blank or blackened division 51 will appear opposite the stationary pointer 63. If it be found that the drum and dial are not interconnected as above described, after the machine has been assembled the necessary adjustment can be produced by means of the screws 68 and 69 which change the relative positions of the wheel 64 and the drum.

In order that the manner of making calculation may be better understood I will now give several examples, and in order to avoid prolixity I will confine myself to the same examples as were given in the specification hereinbefore mentioned in which it was required to compute the interest on a note which matures on December the 30, the present date being considered as January 3rd. In order to find the number of days between these dates, the present date, i. e., January 3rd (on the inner dial) is placed opposite the black division 51 by pressing the knob inwardly and turning the inner dial so that it may take this position. When this operation is completed the number of days to December the 30th is found in the division on the outer dial which is directly opposite to the number "30" in the December division on the inner dial. This number is "361". Suppose next, as before, that the amount of the note is $200.00 and that the interest is stated at 5%. Turn the drum until the given number of days, i. e., 361, appears through the sight opening 8, and directly above the number "200" in the 5% interest portion of the table 10 on the drum is found the interest on $200.00 for three hundred and sixty-one days at five per cent, or $9.89. A further example is given in which it is required to find the interest on a note which was dated some time in the past and matures at the present date, considering in this case the present date as December 30th, and the past date as January 3rd. The interest is computed at 5% on $200.00. The dials are set as before with the present date, i. e., December the 30th opposite the black division on the outer dial and the drum is turned in a right hand rotation until the past date, i. e., January 3rd appears under the indicator 63. On the drum chart, through the sight opening, will appear the number of days between these dates, i. e., three hundred and sixty-one. Directly above "200" in the 5% interest division of the table 10 and on the drum chart appears the number 9.89, which is the interest in dollars and cents on $200.00 at 5% for three hundred and sixty-one days.

Although I have only given the above two examples it will be understood that this machine can be used for finding the number of days intervening between any two dates and for computing the interest on any amount at the given rate of interest for the computed number of days. In using it to compute interest on irregular amounts which may fall due within a certain number of days and years the operation is the same as that already described in my application Serial #419215, after the number of days has been found.

What I claim as my invention is:

1. In a machine of the class described the combination with the inclosing casing having an open forward face, of a central sleeve secured to the rear side of the casing; a conically shaped wheel rotatably mounted on the sleeve; means for preventing longitudinal displacement of the wheel; an annular plate secured to the rim of the wheel; a card on the plate having numbered divisions thereon; one of said divisions being blank; a rotatable shaft passing into and longitudinally slidable within the sleeve; a rotatable dial fixed on the shaft; a spring interposed between the dial and the conical wheel; a card on the dial, such card having the months of the year and the days of the months notated thereon, successively; a stop pin extending from the inner dial and normally engaging with teeth on the outer plate; and a stationary indicator carried by the casing and coöperating with the cards, as and for the purpose specified.

2. In a machine of the class described the combination with the inclosing casing having a lower longitudinal sight opening and an upper circular opening; a rotatably mounted longitudinally disposed drum within the casing, and a computed interest chart having a day index thereon on the drum, of an outer vertically disposed dial interconnected with the drum and rotatable therewith; a card on the dial having numbered divisions thereon; an inner independently rotatable dial having thereon a card bearing the months of the year and the days of the respective months, such cards appearing through the circular sight opening; and a stationary indicator carried by the casing adjacent the cards, as and for the purpose specified.

3. In a machine of the class described the combination with the inclosing casing having a lower longitudinal sight opening and an upper circular opening; a rotatably mounted longitudinally disposed drum within the casing, and a computed interest chart having a day index thereon on the drum; of an outer vertically disposed rotatable dial; a card on the dial, said card having numbered divisions corresponding to the day index on the drum; an indicator carried on the casing and coöperating with the dial, said dial and drum being so interconnected that the numbers indicated on the drum denoting the days and the corresponding number on the dial appear simultaneously through the sight opening and beneath the index pointer respectively; and an inner vertically disposed independently rotatable dial registering with the former dial, and having the months of the year and the days of the month notated thereon, as and for the purpose specified.

Signed at Hanley, in the Province of Saskatchewan, this 27th day of May 1908.

CARL ARNO MEILICKE.

Witnesses:
JNO. L. SISSELL,
E. E. HALL.

W. L. REUSCH.
INSULATOR.
APPLICATION FILED APR. 24, 1909.

961,646.

Patented June 14, 1910.

WITNESSES

INVENTOR
W. L. Reusch
His Atty.